3,100,745
TREATMENT OF DEHYDROGENATION VAPOR EFFLUENT
Bent Busch-Petersen, Secane, Pa., and Robert G. Craig, Wilmington, Del., assignors to Air Products and Chemicals, Inc., a corporation of Delaware
Filed Sept. 2, 1959, Ser. No. 837,750
8 Claims. (Cl. 208—310)

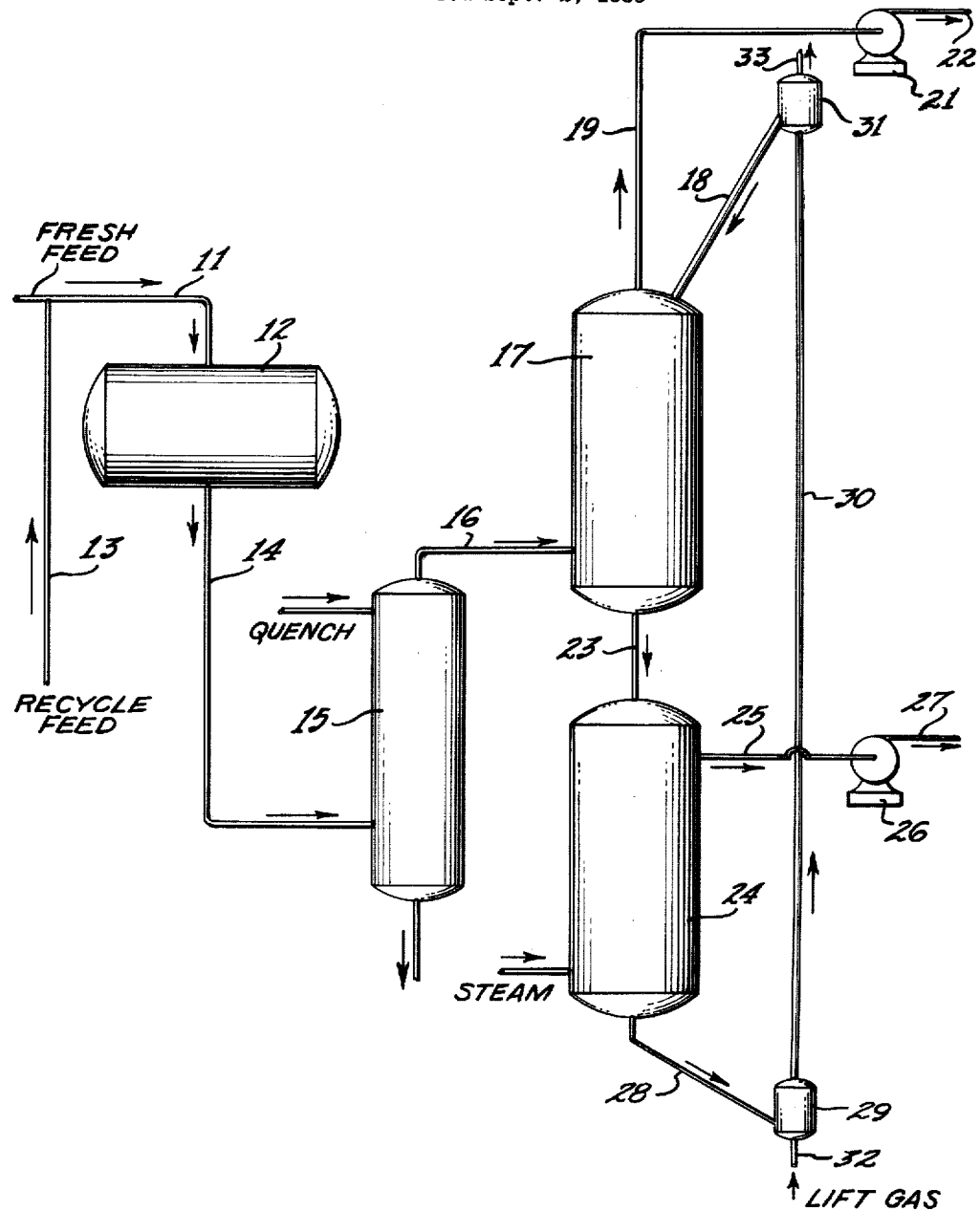

The present invention relates to hydrocarbon conversions in general, and particularly to the dehydrogenation treatment of hydrocarbon gases for the conversion and recovery of useful products, such as the dehydrogenation of a butane feed for ultimate recovery of butadiene.

In dehydrogenation operations as presently carried out, one of the major investment and utility costs is encountered in the construction and operation of equipment for compressing the reactor off-gas, that is, the hydrogen-rich effluent from the dehydrogenation zone, to the elevated pressures generally required for maximum recovery of the desired hydrocarbon product fraction.

In certain dehydrogenation systems, compression of the reactor effluent vapor is accomplished by a relatively large, complicated and costly compression section or unit involving compression by means of a plurality of compression stages, such as three to five, in each of which the desired compression is accomplished by an individually-mounted compressor having separate controls and auxiliary equipment, and having provisions for cooling and for handling the condensed hydrocarbon and water in the intermediate stages of compression. Such systems are well-known in the art and require no further description for a complete understanding of the present invention. Since the initial fabrication and installation costs of compression facilities, as well as the hourly power costs, are quite considerable, any method or system which will minimize the need for such elaborate and expensive equipment and power requirements is of substantial economic advantage.

This invention is particularly applicable in recovery of olefins and/or diolefins produced by dehydrogenation of $C_3$ to $C_5$ hydrocarbons. In such systems, dehydrogenation is generally carried out at sub-atmospheric pressure, although in some instances atmospheric or somewhat above atmospheric pressure is employed.

In accordance with the present invention, the quenched effluent vapor of a dehydrogenation reactor is subjected to selective adsorption in a mass of adsorbent material, such as granules of activated carbon, clay, zeolite, or siliceous material of a "molecular sieve" type, at relatively low pressure. This is in contradistinction to a present practice of adsorbing the hydrocarbons in liquid after compressing the reactor off-gas to elevated pressures in excess of about 135 p.s.i.g.

One suitable method for accomplishing such selective adsorption is by the well-known hypersorption process. The fuel gas product obtained by this method requires some compression but only from slightly below the dehydrogenation reactor pressure to the pressure required at the point of use. Compression of the principal hydrocarbon products desired to be recovered also is necessary, but such compression involves only a comparatively small portion of the total gaseous material treated, and the required compression is from about atmospheric pressure to the condensation pressure of the desired products, such as about 65 p.s.i.g., or higher.

In a typical preferred treatment, the reactor effluent vapor, following the usual quench to a temperature in the range of about 100–500° F., is subjected to selective adsorption in the presence of a bed of adsorbent material. The reactor effluent vapor may be introduced to the adsorber at a pressure slightly below the relatively low discharge pressure of the reactor, such as about 3 p.s.i.a.

Following conventional treatment in the adsorber unit, the gaseous effluent or off-gas, all or most of which is intended for use as fuel gas, is discharged at a slightly lower pressure, such as about 2.5 p.s.i.a., and is then compressed to a pressure sufficient to provide a surge for its intended use, such as 20–50 p.s.i.g., or higher.

The bed of adsorbent material containing the desired adsorbed hydrocarbons is then stripped, in known manner, with a gaseous medium, such as steam, to remove the adsorbed material. The hydrocarbon effluent of the stripping operation is then compressed to the pressure required for subsequent recovery of the desired products, such as about 65 to 85 p.s.i.g. Such recovery may involve depropanizing treatment and other processing to obtain the desired valuable products, such as butadiene, none of which subsequent processing forms any part of this invention.

The granular adsorbed material may be maintained as a continuously circulating body of solids by known pneumatic or mechanical means which continuously receives the solids discharging in compact flow from the lower end of the stripper and returns them to the upper end of the adsorber. The solids then repeat a cycle of compact flow through the adsorber and stripper units. The invention, however, is not limited to a moving bed system. The adsorbent material may be arranged as a fixed bed.

Alternatively, the entire effluent vapor from the quench tower may first be compressed to about 25 to 30 p.s.i.a., and then introduced to the adsorption section for treatment as aforesaid, in which case subsequent pressuring of the fuel gas effluent may not be required.

For a clearer understanding of the invention, reference may be had to the following description and claims taken in connection with the accompanying drawing forming a part of this invention.

In the drawing, diagrammatically illustrating one preferred embodiment of the invention, the fresh butane charge stock is introduced through conduit 11 to the dehydrogenation reactor 12. A portion of recycle feed may be introduced through conduit 13 into conduit 11 so as to accompany the fresh butane feed into the reactor. After treatment under the usual dehydrogenation conditions within the reactor 12, the reactor effluent vapor is passed through conduit 14 to a quench unit 15, and then through conduit 16 to the adsorber unit 17.

Within the adsorber 17, the effluent vapor is contacted countercurrently with a compact moving mass of granular adsorbent material introduced into the upper end of vessel 17 through conduit 18. The unadsorbed gaseous material is discharged overhead as off-gas from adsorber vessel 17 through conduit 19 and is passed to a compressor 21 which compresses the off-gas to approximately 25 p.s.i.a., or higher. The off-gas is then passed through conduit 22 to the point of use, or for treatment in preparation for its use as fuel gas. The granular adsorbent material is passed from the bottom of vessel 17 through seal-leg 23 into the upper end of a stripper vessel 24, where the adsorbent material is stripped of the adsorbed hydrocarbons. The gaseous vaporous effluent of such stripping is withdrawn from vessel 24 through conduit 25 and is passed to a compressor 26 which compresses the effluent sufficiently to effect the desired liquid recovery, such as to about 80 p.s.i.a., or higher. From the compressor 26 the material is passed through conduit 27 to a recovery section, not shown, for further treatment, such as depropanizing. The granular adsorbent material gravitating as a compact moving bed through vessel 24 is discharged from the lower end of the vessel through draw-off conduit 28, which passes the granular material to a receiving zone or vessel 29. Illustrating one method for maintaining continuous circulation of the granular material, the receiving vessel 29 is the engager of a pneumatic lift comprising also the lift pipe 30 and the disengager vessel 31 at the upper end thereof. Lift gas introduced into the engager 29 through inlet 32 conveys the granular material upwardly through the lift pipe 30 into the disengaging zone formed within the relatively large disengager vessel 31. Within vessel 31 the granular solids are disengaged from the lift gas in known manner, and are returned to vessel 17 through conduit 18. The lift gas is discharged from disengager 31 through overhead outlet 33. It is to be understood, of course, that any suitable mechanical means, such as a bucket elevator, may be substituted for the gas lift shown in the drawing.

It is to be understood further that the invention contemplates the use of various adsorbent materials. If activated carbon or equivalent adsorbent material is used, the entire off-gas stream of the adsorber may go to fuel gas. If a siliceous adsorbent is used, an additional adsorption step is required to recover valuable product from the first adsorber off-gas. Thus, as an alternative to the foregoing arrangement for recovering valuable products from the dehydrogenation reactor vapor effluent, the adsorber 17 may be provided with a siliceous type of adsorbent, commonly known as a molecular sieve, capable of selectively passing a wider cut comprising components in addition to those light components which would normally go to fuel gas. Thus, whereas in the foregoing description the adsorber 17, containing activated carbon as the adsorbent, may pass as an overhead or off-gas product all of the $C_2$ and lighter compounds, substantially all of which may go to fuel gas, in the alternative arrangement a siliceous adsorbent material may pass as an overhead effluent all of the $C_3$ and lighter compounds plus saturated $C_4$'s, in which latter case the stripper effluent may comprise a butylene/butadiene mixture. In such case, the off-gas of the adsorber 17 may be sent to another adsorber containing activated carbon or possibly additional molecular sieve type of adsorbent, thereby recovering additional valuable products from the off-gas stream and sending the off-gas of the secondary adsorption step to fuel gas.

Similar separations may be made between propane and propylene, iso-butane and iso-butylene, etc. Dependent upon the economics of recovery, it may or may not be desirable to treat the off-gas of the first adsorber, thereby sending all of the off-gas to fuel gas.

The required compression of the several discharge streams of gaseous material will of course depend upon the particular processing contemplated, but, in any case, it should be considerably below that required in the aforementioned systems in present use. By lowering the pressuring requirements by about 50 percent or more, that is, from about 150 p.s.i.a. to about 25 to 80 p.s.i.a., substantial savings are effected.

While the method of this invention generally permits the quenched reactor effluent vapor to be passed through the adsorption unit without pre-compression, since the discharge pressure of the reactor is normally sufficient for such purpose, it is contemplated that where the reactor is operating under vacuum, a compressor may be used between the quench tower and the adsorber 17 to compress the effluent to about 20–25 p.s.i.a., or higher, if necessary.

The following exemplifies typical operations under the prior practice of compressing the reactor effluent before subjecting it to treatment in a conventional gas plant.

Reactor conditions vary somewhat with the nature of the charge stock. With a $C_3$ charge stock for olefin production, the reactor may operate in a temperature range of 1050–1200° F. and at pressures of from about 3.5 to 20 or 25 p.s.i.a. Nominal reactor temperatures may be about 1125–1150° F., with the higher temperatures being employed at the higher pressures. The reactor effluent is quenched and then compressed in a stagewise operation to pressures in the range of about 150–400 p.s.i.a., and the compressed gases are passed at a temperature of approximately 100° F. to the gas plant for further processing.

A normal $C_4$ charge stock may be dehydrogenated for either mono-olefin or diolefin product at temperatures in the range of 1000–1200° F., nominally about 1100° F. For mono-olefin production the pressure may be in the range of 2.5–25.0 p.s.i.a., and for diolefin production, 2.5–3.5 p.s.i.a. In either case, the effluent is generally compressed to about 150 p.s.i.a. and sent to the gas plant at a temperature of approximately 100° F.

In the case of an iso-$C_5$ charge stock for diolefin production, the reactor conditions may be similar to those employed for a $C_4$ stock, with possible operation at a lower level in the reactor temperature and pressure ranges. The required compression for gas plant treatment may be appreciably lower, such as about 100 p.s.i.a.

The gaseous effluent or off-gas from the adsorption and stripping treatment in the gas plant goes to the fuel gas recovery system, while the remainder comprising desired olefins and/or diolefins goes to the product recovery system, wherein the desired olefin product is recovered in liquid form.

For treatment of comparable charge stocks in accordance with the present invention the reaction conditions will be similar to the foregoing, but there is a significant change in the pressuring requirements for the reactor effluent vapor. If the reactor is operating under vacuum, a compressor may be used to raise the pressure of the quenched effluent to about 20–25 p.s.i.a., or in any event to a pressure substantially lower than would be required for light gas separation in the conventional liquid adsorption system. Otherwise, the effluent may be passed at its reactor discharge pressure directly to the selective adsorption system. It is only after the effluent vapor has been subjected to adsorption and stripping that repressuring is required. The gaseous effluent or off-gas from the adsorber is passed to the fuel gas system and need be compressed only to the fuel system pressure. The product effluent from the stripper is pumped to the recovery system at pressures dependent upon the composition. For $C_3$ product the pressure may be in the range of 150–350 p.s.i.a.; for $C_4$, 8–120 p.s.i.a.; and for $C_5$, 50–80 p.s.i.a.

The advantages of having to pressurize at low temperature only a relatively small volume of product derived from the original charge stock are obvious. In a commercial plant, for example, capable of producing 40,000 tons/yr. of butadiene from butane charge stock the investment costs of the compression and gas plant facilities amount to several million dollars. Power costs for high compression, as in the prior practice, amount to about a thousand dollars a day. While the present invention does not necessarily eliminate the need for compression, it does eliminate the need for compressing the total reactor effluent. Such compression as may be required is limited to the needs of the particular product fraction discharging from the gas plant system, with resultant savings by reason of lower capacity and lower temperatures.

Obviously, many modifications and variations of the invention hereinbefore set forth may be made without departing from the spirit and scope thereof, and, therefore, only such limitations should be imposed as are indicated in the appended claims.

What is claimed is:

1. The method of recovering unsaturated $C_3$–$C_5$ hydrocarbons from a dehydrogenator vapor effluent having a low discharge pressure, below about 20 p.s.i.g., and consisting predominantly of a mixture of saturated and unsaturated $C_3$–$C_5$ hydrocarbons contaminated by relatively small amounts of hydrogen and $C_1$–$C_2$ hydrocarbons which method comprises the steps of: quenching said vapor effluent to a temperature in the range of about 100–500° F.; contacting said quenched vapor effluent with a compact mass of granular adsorbent material to thereby selectively adsorb a fraction of said effluent containing the substantial major portion of said unsaturated hydrocarbons as well as some of said saturated hydrocarbons, said quenching and adsorbing treatments being carried out at pressures slightly below said discharge pressure and without intermediate pressuring; withdrawing from said mass of adsorbent material the unadsorbed fraction of said effluent, comprising a fuel gas mixture consisting predominantly of said hydrogen and $C_1$–$C_2$ hydrocarbons together with the remaining saturated hydrocarbons; compressing said unadsorbed fraction to the extent necessary to render it available as fuel gas; passing a hot inert gaseous material through said compact mass to strip said granular material of the selectively adsorbed hydrocarbons; withdrawing the total vapor effluent of said stripping step and separately compressing the same to a pressure above about 65 p.s.i.g. sufficient to condense the heavier hydrocarbon components; and recovering the desired unsaturated $C_3$–$C_5$ hydrocarbons from the liquefied product of such condensation.

2. The method of claim 1, in which said granular adsorbent material comprises activated carbon, whereby said unadsorbed fraction of vapor effluent is composed substantially entirely of $C_2$ and lighter materials utilizable as fuel gas.

3. The method of claim 1, in which said granular adsorbent material comprises a selectively adsorptive, molecular sieve type of siliceous material, whereby said unadsorbed fraction of said quenched vapor effluent additionally comprises all of the $C_3$ compounds as well as the saturated $C_4$ compounds so that said total vapor effluent of said stripping step contains substantially all of the $C_4$–$C_5$ unsaturates; and including the step of contacting said unadsorbed fraction of said quenched vapor effluent with additional adsorbent material to remove therefrom hydrocarbon materials other than those comprising said fuel gas mixture.

4. The method of claim 1 in which said dehydrogenator discharge pressure is about 3 p.s.i.a.

5. The method of claim 1, in which said compact mass of granular adsorbent material comprises a body of moving solids continuously circulating through separate adsorption and stripping zones.

6. The method of claim 5, in which said body of moving solids gravitates as a compact moving bed within each of said adsorption and stripping zones, and in which the flow of gaseous material in each of said zones is countercurrent to the gravitational flow of said granular material.

7. The method of recovering unsaturated $C_3$–$C_5$ hydrocarbons from a dehydrogenator vapor effluent having a low discharge pressure, below about 20 p.s.i.g., and consisting predominantly of a mixture of saturated and unsaturated $C_3$–$C_5$ hydrocarbons contaminated by relatively small amounts of hydrogen and $C_1$–$C_2$ hydrocarbons, which method comprises the steps of: quenching said vapor effluent to a temperature in the range of about 100–500° F. and at a pressure below said discharge pressure; contacting said quenched vapor effluent with a compact mass of granular adsorbent material to thereby selectively adsorb a fraction of said effluent containing the substantial major portion of said unsaturated hydrocarbons as well as some of said saturated hydrocarbons, both said quenching and adsorbing treatments being carried out at pressures up to about 25 p.s.i.a.; withdrawing from said mass of adsorbent material the unadsorbed fraction of said effluent, comprising a fuel gas mixture consisting predominantly of said hydrogen and $C_1$–$C_2$ hydrocarbons together with the remaining saturated hydrocarbons; compressing said unadsorbed fraction to the extent necessary to render it available as a fuel gas supply; passing a hot inert gaseous material through said compact mass to strip said granular material of the selectively adsorbed hydrocarbons; withdrawing the total vapor effluent of said stripping step and separately compressing the same to a pressure above about 65 p.s.i.g. sufficient to condense the heavier hydrocarbon components; and recovering the desired unsaturated $C_3$–$C_5$ hydrocarbons from the liquefied product of such condensation.

8. The method of claim 7, in which said dehydrogenator discharge pressure is about 3 p.s.i.a., and in which said quenched vapor effluent is pressured to about 20–30 p.s.i.a. prior to said adsorbing treatment.

References Cited in the file of this patent
UNITED STATES PATENTS

| | | |
|---|---|---|
| 2,376,425 | Frey | May 22, 1945 |
| 2,651,666 | Berg et al. | Sept. 8, 1953 |
| 2,723,300 | Lewis | Nov. 8, 1955 |
| 2,816,943 | Delaplaine | Dec. 17, 1957 |
| 2,850,114 | Kehde et al. | Sept. 2, 1958 |
| 2,882,243 | Milton | Apr. 14, 1959 |
| 2,978,522 | Cahn | Apr. 4, 1961 |

UNITED STATES PATENT OFFICE
CERTIFICATE OF CORRECTION

Patent No. 3,100,745                              August 13, 1963

Bent Busch-Petersen et al.

It is hereby certified that error appears in the above numbered patent requiring correction and that the said Letters Patent should read as corrected below.

Column 2, line 20, for "adsorbed" read -- adsorbent --.

Signed and sealed this 28th day of April 1964.

(SEAL)
Attest:

ERNEST W. SWIDER                           EDWARD J. BRENNER

Attesting Officer                               Commissioner of Patents